United States Patent
Nacharaju et al.

(10) Patent No.: US 9,920,146 B2
(45) Date of Patent: Mar. 20, 2018

(54) METHODS OF TREATMENT TO IMPROVE THE QUALITY OF ALCOHOLIC BEVERAGES USING VINYL LACTAM-DERIVED POLYMER-HYDROGEN PEROXIDE COMPLEXES

(71) Applicant: ISP Investments LLC, Wilmington, DE (US)

(72) Inventors: Krishnamurthy Nacharaju, Hilliard, OH (US); Giovanni Nicola Onnembo, Wayne, NJ (US); Mustafa Rehmanji, Riverdale, NJ (US); Andrew Mola, Highland Lakes, NJ (US); Bala Balasanmugam, Wayne, NJ (US); Joycelyn Yapchulay, Jersey City, NJ (US)

(73) Assignee: ISP Investments LLC, Wilmington, DE (US)

( * ) Notice: Subject to any disclaimer, the term of this patent is extended or adjusted under 35 U.S.C. 154(b) by 0 days.

(21) Appl. No.: 15/313,278

(22) PCT Filed: May 21, 2015

(86) PCT No.: PCT/US2015/031943
§ 371 (c)(1),
(2) Date: Nov. 22, 2016

(87) PCT Pub. No.: WO2015/179622
PCT Pub. Date: Nov. 26, 2015

(65) Prior Publication Data
US 2017/0190813 A1    Jul. 6, 2017

Related U.S. Application Data

(60) Provisional application No. 62/002,391, filed on May 23, 2014.

(51) Int. Cl.
*C08F 126/10* (2006.01)
*C08F 222/10* (2006.01)
*C08F 222/18* (2006.01)
*C12H 1/056* (2006.01)

(52) U.S. Cl.
CPC .......... *C08F 126/10* (2013.01); *C08F 222/10* (2013.01); *C08F 222/18* (2013.01); *C12H 1/0424* (2013.01)

(58) Field of Classification Search
CPC .... C08F 126/10; C08F 222/10; C08F 222/18; C12H 1/0424
See application file for complete search history.

(56) References Cited

U.S. PATENT DOCUMENTS

| | | | |
|---|---|---|---|
| 3,480,557 A | 11/1969 | Shiraeff | |
| 3,933,766 A | 1/1976 | Hofmann et al. | |
| 4,594,250 A * | 6/1986 | Lautenschlaeger | A23C 7/043 426/257 |
| 5,008,093 A | 4/1991 | Merianos | |
| 5,744,183 A * | 4/1998 | Ellsworth | C12H 1/0424 426/330.4 |
| 6,239,206 B1 * | 5/2001 | Fussnegger | B01D 15/00 426/271 |
| 2008/0113071 A1 | 5/2008 | Cohen | |

OTHER PUBLICATIONS

International Search Report, PCT/US2015/031943 published on Nov. 26, 2015.

* cited by examiner

*Primary Examiner* — Anthony Weier
(74) *Attorney, Agent, or Firm* — William J. Davis

(57) ABSTRACT

Provided is a method of treatment of an alcoholic beverage, particularly beer or wine, for removing ingredient(s) causing undesirable sulfury and/or fatty flavor(s), by contacting the beverage with a composition having a polymer-hydrogen peroxide complex, wherein the polymer is derived from at least one N-vinyl lactam monomer, and wherein the hydrogen peroxide is present in an amount from about 1% by weight to about 50% by weight of the complex. Provided further is a method of treatment of an alcoholic beverage to remove at least (a) at least one ingredient causing at least one undesirable sulfury and/or fatty flavor, and (b) at least one ingredient causing colloidal haze, including contacting the beverage with a composition described herein. Provided furthermore is an alcoholic beverage obtained by the method (s) of treatment described herein.

10 Claims, 2 Drawing Sheets

Morten Meilgaard's Beer Flavor Wheel

Peroxydone™ complexes containing a mixture of 1:1 and 1:2
ratios of hydrogen peroxide to N-vinyl pyrrolidone $H_2O_2$ PVP    1:1   [23.45% $H_2O_2$]

$H_2O_2$ PVP    1:2   [13.28% $H_2O_2$]

METHODS OF TREATMENT TO IMPROVE THE QUALITY OF ALCOHOLIC BEVERAGES USING VINYL LACTAM-DERIVED POLYMER-HYDROGEN PEROXIDE COMPLEXES

BACKGROUND

Field of the Invention

The invention relates to methods of treatment of alcoholic beverages to improve the quality thereof by contacting the beverage with compositions comprising vinyl lactam-derived polymers that exist in the form of molecular complexes with hydrogen peroxide. Particularly, the invention relates to methods of treatment of alcoholic beverages to remove one or more ingredients causing one or more undesirable sulfury and/or fatty flavors. The invention further relates to methods of treatment of alcoholic beverages to remove one or more ingredients causing one or more undesirable sulfury and/or fatty flavors and as well as one or more ingredients causing colloidal haze.

Description of Related Art

Alcoholic beverages include fermented beverages and distilled beverages. Non-limiting examples of fermented beverages include beer, cauim (made from cassava or maize), chicha (made from cassava, maize root, grape, apple or other fruits), cider (made from apple juice or other fruit juice), huangjiu (Chinese, made from rice, millet, or wheat using a special starter culture of yeast, mold, and bacteria), icariine liquor, mead (made from honey), palm wine (made from the sap of various palm trees), pulque (originally made by the natives of Mexico, made from the sap of the maguey plant), tiswin (made from corn or saguaro, a large cactus), and wine. A distilled beverage, spirit, or liquor is an alcoholic beverage containing ethanol that is produced by distilling ethanol produced by means of fermenting grain, fruit, or vegetables. Vodka, gin, baijiu, tequila, rum, whisky, brandy, and soju are non-limiting examples of distilled beverages.

Beer is an alcoholic beverage produced by the saccharification of starch and fermentation of the resulting sugar. The preparation of beer is called brewing.

More than 1,000 different flavor ingredients have been identified in beer, and more are being found as increasingly sensitive analytical methods are developed. Some of these flavors are derived from raw materials (malt, adjuncts, hops, and water), but the vast majority are formed by yeast during fermentation. Chemical and physical methods of analysis can provide a great deal of information about these ingredients; however, no instrument has been able to replace a trained taster. The physiochemical properties of a beer may be entirely within laboratory specifications, but this analysis is meaningless unless the flavor of the beer is acceptable to the drinker.

Two important tools have been developed over the past 30 years to help establish a standard vocabulary for beer sensory analysis, both by Dr. Morten Meilgaard: first, an early system based on flavor units and then, the Beer Flavor Wheel. Meilgaard developed the flavor wheel in an attempt to standardize the language of flavor analysis. The flavor wheel gives each distinct flavor a descriptive name and groups it with similar flavors into 14 classes.

Sulfury flavor is one of the descriptive names on the Beer Flavor Wheel. Some of these flavors are desirable in continental lager styles, where they complement the malty aroma. On the other hand, some are considered defects by brewers of British ales, who select the malt, yeast, and fermentation method most likely to minimize the formation of volatile sulfur compounds. Though strain-dependent, lager yeasts generally produce a much larger variety of sulfur compounds during fermentation than ale yeasts; sulfury flavors are therefore one way of distinguishing between lagers and ales. Not all sulfury flavors are formed during the normal brewing process; they can also result from bacterial contamination or poor handling. These antagonists transform sulfur compounds that otherwise are not flavor-active (such as the sulfur-containing amino acids methionine and cysteine) into undesirable off flavors such as hydrogen sulfide and mercaptans.

Sulfury flavors are caused due to the presence of one or more sulfur-containing ingredients. One of the most important sources of sulfur in beer is the sulfate ion. Sulfate ions are derived from sulfuric acid or sulfate salts and consist of a sulfur atom covalently bonded to four oxygen atoms. In nature, they are often found in combination with positively charged calcium and magnesium ions (which hydrate to form gypsum and Epsom salts, respectively).

The sulfite ion is derived from salts of sulfurous acid and consists of a sulfur atom bonded to three oxygen atoms. Sulfites and bisulfites are both strong reducing agents, capable of accepting oxygen atoms from other compounds to form sulfur dioxide and water. Most of the sulfites in beer are bound to carbonyl compounds, which diminishes both their flavor activity and their reducing capacity. A very small amount will remain free and eventually form sulfur dioxide. When present in high concentrations in beer (typically greater than 20 ppm), sulfur dioxide gives the aroma of a struck match.

Sulfidic flavors are produced by hydrogen sulfide, thiols (or mercaptans), thioesters, and related compounds. All are undesirable in beer, and all become more offensive as their concentrations increase. Hydrogen sulfide ($H_2S$) is probably the best understood member of this group. It is a fermentation by-product with a low sensory threshold of only a few ppb. It makes its presence known by imparting to beer the aroma and taste of rotten eggs.

Thiols, also known as mercaptans, are closely related to hydrogen sulfide. The most relevant members of the thiol family in brewing are methyl-, ethyl-, and butyl-mercaptans. These compounds have aromas that may remind one of putrefied cabbage, garlic, onion, or egg. At very high concentrations they may be perceived as shrimplike.

Other sulfidic flavors attributed to mercaptans have garlic, cabbage, or burnt rubber notes. Similar flavors are associated with diethyl sulfide, diethyl disulfide, and polysulfides. These diethyl compounds are generally regarded as equivalents to dimethyl sulfide with respect to their formation in the brewing process. Polysulfides such as dimethyl trisulfide and dimethyl tetrasulfide are found in hop oils. Dimethyl trisulfide is usually destroyed by sulfur dioxide when sulfur is burnt in the oasthouse, but is slowly regenerated during storage.

Cooked vegetable flavors are generally associated with dialkyl sulfides. Dimethyl sulfide (DMS) is the most widely studied compound in this category because of its importance as a flavor constituent in lager beer styles. DMS is rarely present in isolation, but is typically coupled with other compounds such as dimethyl disulfide (DMDS), dimethyl trisulfide (DMTS), and diethyl disulfide (DES).

Sulfury flavors attributable to yeast comprise both healthy yeast flavors and unpleasant off flavors resulting from yeast autolysis. Yeast autolysis produces an unmistakable rotten, rubbery, or shrimplike stench easily distinguishable from the meaty aroma of fresh yeast. Autolysis occurs under stressed conditions such as high osmotic pressure (alcohol or sugars), extremely high temperatures, long-term storage, or sudden environmental changes.

Diacetyl (2,3-butanedione) is perceived as a buttery, creamy, milky or butterscotch flavor that can occur in beer. Diacetyl is generally formed in beer from a precursor chemical produced by yeast during fermentation. It can also be formed by contaminant bacteria when hygiene standards are poor. Diacetyl is one of a class of compounds called "vicinal diketones". Diacetyl belongs to the class of fatty flavors.

Beer stability encompasses many aspects including microbial stability, colloidal stability and flavor stability. The beer product must look good and taste good at the end of the shelf life, as it did when freshly packaged. Whilst the natural ageing of beer will adversely impact both clarity and flavor, the use of stabilizing agents can help to ensure product quality. As beer is intrinsically colloidally-unstable, without proper treatment, chill haze (non-permanent) may develop that can lead to sedimentation and precipitation (permanent haze). Beer haze results from the interaction of beer constituents that aggregate to form visible particles in solution that reflect light.

UK patent application GB 2,100,750 discloses removal of excess sulfur dioxide contained in juices, concentrates, wines, and spirits by addition of a strong solution of hydrogen peroxide.

UK patent 1,248,501 discloses a method of treating beer, comprising contacting fermented beer with a polyvinyl resin modified clay, the resin portion of the clay constituting by weight 1 to 30% of the weight of such clay. The patent further discloses that beer is treated to remove clay adsorbable proteinaceous complexes, tannins or other delirious elements.

US published patent application No. 2008/0113071 discloses compositions comprising poly N-vinyl pyrrolidone (PVPP) with improved capability to remove polyphenols and useful for reducing the formation of colloidal haze in beverages such as beer. The compositions are prepared in a process which comprises: providing a composition comprising PVPP; adding a quantity of hydrogen peroxide to the composition; generating a slurry; mixing the slurry; and removing from the slurry, the "improved PVPP". In one embodiment, the quantity of hydrogen peroxide may bring the concentration of hydrogen peroxide in the slurry to from about 0.5% to about 5%. In another embodiment, the quantity of hydrogen peroxide may bring the concentration of hydrogen peroxide in the slurry to from about 1% to about 3%. However the process does not result in any significant amount of $H_2O_2$ complexing with the PVPP. Moreover there is no suggestion of using the "improved PVPP" for removal of hydrogen sulfide and/or diacetyl from beer.

A technical paper by Terry Robbins and Brian Boillat, published in Water & Process Technologies, GE Power & Water, reviews the chemical treatment programs available to control $H_2S$ as well as some non-sulfide odors. These include organic scavengers that react with reduced sulfur compounds, neutralizers that eliminate an odor's objectionable characteristics, nitrates and inhibitors that prevent bacteria from producing sulfides, masking agents that replace one odor with another, and metal salts that removes sulfides as metallic precipitates.

Therefore, there remains a necessity in the art for an efficient, economical and facile method of treatment for removal of ingredient(s) causing undesirable flavor(s), particularly sulfury and/or fatty off flavor(s) from alcoholic beverages, such as, beer and wine. The invention addresses this necessity.

SUMMARY

Figure 1:
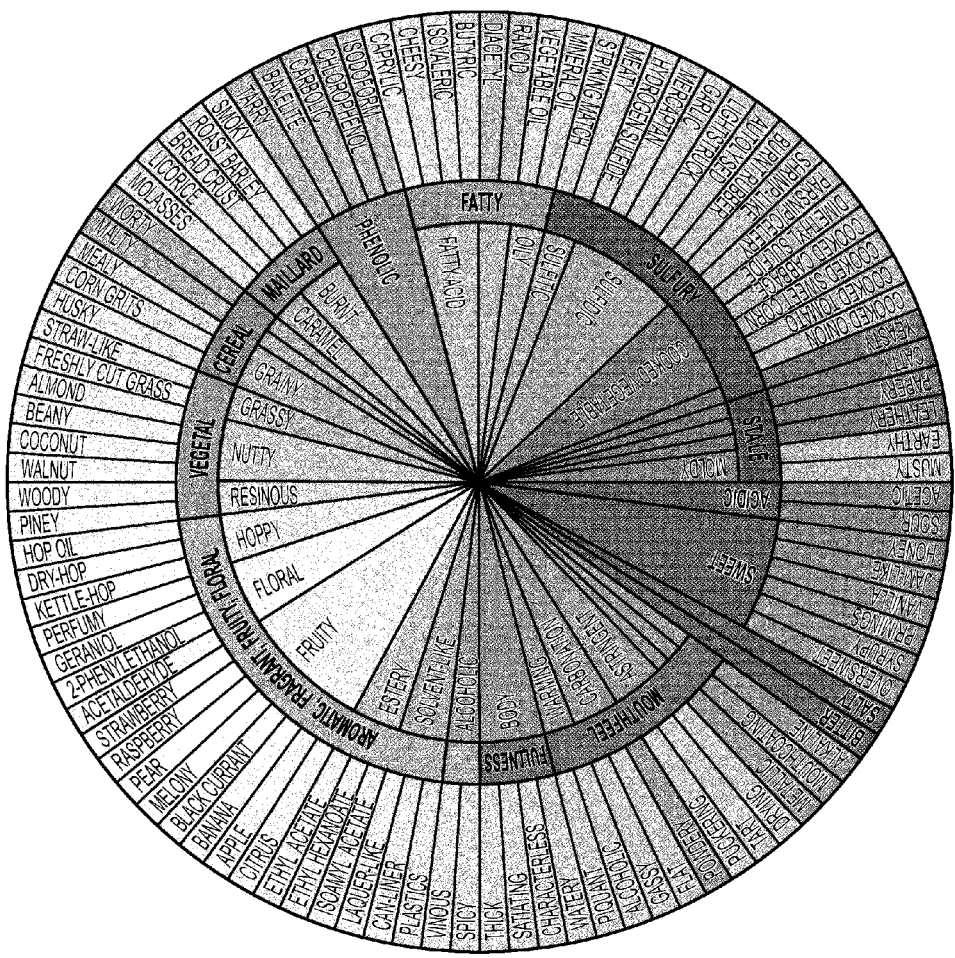
FIG. 1 is a representation of the Morten Meilgaard Beer Flavor Wheel.

In a first aspect, the invention provides a method of treating an alcoholic beverage to remove at least one ingredient causing at least one undesirable sulfury and/or fatty flavor comprising contacting the beverage with a composition comprising a polymer-hydrogen peroxide complex, wherein the polymer is derived from at least one N-vinyl lactam monomer, and wherein the hydrogen peroxide is present from about 1% by weight to about 50% by weight of the complex.

In a second aspect, the invention provides a method of treating an alcoholic beverage to remove at least (a) at least one ingredient causing at least one undesirable sulfury and/or fatty flavor, and (b) at least one ingredient causing colloidal haze, comprising contacting the beverage with a composition comprising a polymer-hydrogen peroxide complex, wherein the polymer is derived from at least one N-vinyl lactam monomer, and wherein the hydrogen peroxide is present from about 1% by weight to about 50% by weight of the complex.

In a third aspect, the invention provides a method of preparing an alcoholic beverage that comprises the aforementioned method of treatment.

In a fourth aspect, the invention provides an alcoholic beverage obtained by the aforementioned method(s) of treatment.

DETAILED DESCRIPTION

Before explaining at least one aspect of the disclosed and/or claimed inventive concept(s) in detail, it is to be understood that the disclosed and/or claimed inventive concept(s) is not limited in its application to the details of construction and the arrangement of the components or steps or methodologies set forth in the following description or illustrated in the drawings. The disclosed and/or claimed inventive concept(s) is capable of other aspects or of being practiced or carried out in various ways. Also, it is to be understood that the phraseology and terminology employed herein is for the purpose of description and should not be regarded as limiting.

Unless otherwise defined herein, technical terms used in connection with the disclosed and/or claimed inventive concept(s) shall have the meanings that are commonly understood by those of ordinary skill in the art. Further, unless otherwise required by context, singular terms shall include pluralities and plural terms shall include the singular.

All patents, published patent applications, and non-patent publications referenced in any portion of this application are herein expressly incorporated by reference in their entirety to the same extent as if each individual patent or publication was specifically and individually indicated to be incorporated by reference.

All of the compositions and/or methods disclosed herein can be made and executed without undue experimentation in light of the present disclosure. While the compositions and methods of the disclosed and/or claimed inventive concept(s) have been described in terms of particular aspects, it will be apparent to those of ordinary skill in the art that variations may be applied to the articles and/or methods and in the steps or in the sequence of steps of the method described herein without departing from the concept, spirit and scope of the disclosed and/or claimed inventive concept(s). All such similar substitutes and modifications apparent to those skilled in the art are deemed to be within the spirit, scope and concept of the disclosed and/or claimed inventive concept(s).

As utilized in accordance with the disclosure, the following terms, unless otherwise indicated, shall be understood to have the following meanings.

The use of the word "a" or "an" when used in conjunction with the term "comprising" may mean "one," but it is also consistent with the meaning of "one or more," "at least one," and "one or more than one." The use of the term "or" is used to mean "and/or" unless explicitly indicated to refer to alternatives only if the alternatives are mutually exclusive, although the disclosure supports a definition that refers to only alternatives and "and/or."

Throughout this application, the term "about" is used to indicate that a value includes the inherent variation of error for the quantifying device, the method being employed to determine the value, or the variation that exists among the study subjects. For example, but not by way of limitation, when the term "about" is utilized, the designated value may vary by plus or minus twelve percent, or eleven percent, or ten percent, or nine percent, or eight percent, or seven percent, or six percent, or five percent, or four percent, or three percent, or two percent, or one percent.

The use of the term "at least one" will be understood to include one as well as any quantity more than one, including but not limited to, 1, 2, 3, 4, 5, 10, 15, 20, 30, 40, 50, 100, etc. The term "at least one" may extend up to 100 or 1000 or more depending on the term to which it is attached. In addition, the quantities of 100/1000 are not to be considered limiting as lower or higher limits may also produce satisfactory results. In addition, the use of the term "at least one of X, Y, and Z" will be understood to include X alone, Y alone, and Z alone, as well as any combination of X, Y, and Z. The use of ordinal number terminology (i.e., "first", "second", "third", "fourth", etc.) is solely for the purpose of differentiating between two or more items and, unless otherwise stated, is not meant to imply any sequence or order or importance to one item over another or any order of addition.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. The term "or combinations thereof" as used herein refers to all permutations and combinations of the listed items preceding the term. For example, "A, B, C, or combinations thereof" is intended to include at least one of: A, B, C, AB, AC, BC, or ABC and, if order is important in a particular context, also BA, CA, CB, CBA, BCA, ACB, BAC, or CAB. Continuing with this example, expressly included are combinations that contain repeats of one or more item or term, such as BB, AAA, MB, BBC, AAAB-CCCC, CBBAAA, CABABB, and so forth. The skilled artisan will understand that typically there is no limit on the number of items or terms in any combination, unless otherwise apparent from the context.

The term "each independently selected from the group consisting of" means when a group appears more than once in a structure, that group may be selected independently each time it appears.

The term "hydrocarbyl" refers to a straight-chain, branched-chain, or cyclic, mono-, di-, or polyvalent group having hydrogen and carbon atoms with or without additional atom(s) of different kind(s). The additional atom(s) may include one or more heteroatom(s).

The term "alkyl" refers to a functionalized or unfunctionalized, monovalent, straight-chain, branched-chain, or cyclic hydrocarbyl group optionally having one or more heteroatoms. Non-limiting examples of alkyl groups include methyl, ethyl, n-propyl, isopropyl, n-butyl, isobutyl, tert-butyl, n-pentyl, isopentyl, n-hexyl, n-heptyl, n-octyl, 2-ethylhexyl, tert-octyl, iso-norbornyl, n-dodecyl, tert-dodecyl, n-tetradecyl, n-hexadecyl, n-octadecyl, and n-eicosyl.

The term "alkylene" refers to a functionalized or unfunctionalized, divalent, straight-chain, branched-chain, or cyclic hydrocarbyl group optionally having one or more heteroatoms. Non-limiting examples of alkylene groups include —CH$_2$—. —CH$_2$—CH$_2$—, —CH(CH$_3$)—CH$_2$—, —CH$_2$—CH(CH$_3$)—, —C(CH$_3$)$_2$—CH$_2$—, —CH$_2$—C(CH$_3$)$_2$—, —CH(CH$_3$)—CH(CH$_3$)—, —C(CH$_3$)$_2$—C(CH$_3$)$_2$—, —CH$_2$—CH$_2$—CH$_2$—, —CH(CH$_3$)—CH$_2$—CH$_2$—, —CH$_2$—CH(CH$_3$)—CH$_2$—, —CH$_2$—CH$_2$—CH(CH$_3$)—, —CH$_2$—CH$_2$—CH$_2$—CH$_2$—, —CH$_2$—CH$_2$—CH$_2$—CH$_2$—CH$_2$—, —CH$_2$—CH$_2$—CH$_2$—CH$_2$—CH$_2$—CH$_2$—, —CH$_2$—CH$_2$—CH$_2$—CH$_2$—CH$_2$—CH$_2$—CH$_2$—, —CH$_2$—CH$_2$—CH$_2$—CH$_2$—CH$_2$—CH$_2$—CH$_2$—CH$_2$—, and

The term "heteroatom" refers to oxygen, nitrogen, sulfur, silicon, phosphorous, and/or halogen. The heteroatom(s) may be present as a part of one or more heteroatom-containing functional groups. Non-limiting examples of heteroatom-containing functional groups include ether, hydroxy, epoxy, carbonyl, amide, ester, carboxylic acid, imine, imide, amine, sulfonic acid, sulfonamide, phosphonic acid, and silane groups.

The term "halogen" refers to chloro, bromo, iodo and/or fluoro.

The term "functionalized" refers to the state of a moiety that has one or more functional groups introduced to it by way of one or more functionalization reactions known to a person having ordinary skill in the art. Non-limiting examples of functionalization reactions include epoxidation, etherification, sulfonation, hydrolysis, amidation, esterification, hydroxylation, dihyroxylation, amination, ammonolysis, acylation, nitration, oxidation, dehydration, elimination, hydration, dehydrogenation, hydrogenation, acetalization, halogenation, dehydrohalogenation, Michael addition, aldol condensation, Canizzaro reaction, Mannich reaction, Clasien condensation, Suzuki coupling, and the like.

The term "unfunctionalized" refers to the state of a moiety that is not functionalized.

The term "residue of" refers to a fragment of a reactant that remains after a reaction with another reactant(s). The residue may be mono-, di- or polyvalent.

The term "monomer" refers to a low molecular weight compound that is capable of chemically bonding during polymerization to one or more compounds of the same or different kind to form a polymer.

The term "polymer" refers to a high molecular weight compound having one or more types of monomer residues (repeating units) connected by covalent chemical bonds. By this definition, polymers include compounds wherein the number of monomer units may range from very few, which more commonly may be called as oligomers, to very many. Non-limiting types of polymers include homopolymers, and non-homopolymers such as copolymers, terpolymers, tetrapolymers and the higher analogues. A polymer may have a random, block, and/or alternating architecture.

The term "homopolymer" refers to a polymer that is formed from a single type of monomer.

The term "non-homopolymer" refers to a polymer that is formed from two or more different types of monomers. A non-homopolymer could be a copolymer, a terpolymer, or higher analogues.

The term "copolymer" refers to a non-homopolymer that is formed from two different types of monomers.

The term "terpolymer" refers to a non-homopolymer that is formed from three different types of monomers.

The term "non-crosslinked polymer" refers to a polymer that is not crosslinked.

The term "branched" refers to any non-linear molecular structure. The term includes both branched and hyperbranched structures.

The term "free radical addition polymerization initiator" refers to a compound used in a catalytic amount to initiate a free radical addition polymerization. The choice of initiator depends mainly upon its solubility and its decomposition temperature.

The term "alkyl (meth) acrylate" refers to an alkyl ester of acrylic and/or methacrylic acid.

The term "alkyl (meth) acrylamide" refers to an alkyl amide of acrylic and/or methacrylic acid.

The term "alcoholic beverage" refers to any drinkable composition comprising ethyl alcohol and particularly suitable for human consumption. Non-limiting examples of alcoholic beverages include beer and wine.

The term "flavor" refers to the total impression of taste, odor, tactile, kinesthetic, temperature, and pain sensations perceived through tasting. Flavor perceptions are a complicated mix of one or more of these factors.

The term "undesirable flavor" or "off flavor" of a beverage is generally used to describe any unpleasant odor(s) and/or taste(s) of the beverage. Such an unpleasant odor and/or taste may result from many factors such as natural deterioration and/or contamination of a beverage. Detecting any of these "conditions" involves organoleptic appraisal of the off flavor quality of a beverage.

The term "sulfury flavor" refers to a descriptive name of a flavor on the Morten Meilgaard's Beer Flavor Wheel (represented in FIG. 1). The sulfury flavors have been divided into four categories on the Beer Flavor Wheel with more than a dozen sub-descriptors. The first category of sulfury flavors is described as "sulfitic" flavors, which includes the aroma of a "struck match" and "meaty". The second category of sulfury flavors is described as "sulfidic" flavors, which include hydrogen sulfide, mercaptans, "garlic", "lightstruck", "autolysed", "burnt-rubber", and "shrimp-like" flavors. The third category of sulfury flavors includes "cooked vegetable" flavors, which are primarily caused by dimethyl sulfide (DMS) and related compounds. "Yeasty" flavors make up the forth category in this group.

The term "undesirable sulfury flavor" refers to any sulfury flavor that is not desirable from the view point of quality of an alcoholic beverage. When a sulfury flavor becomes undesirable, one or more ingredient(s) causing the sulfury flavor needs removal, either partly or completely, in order to improve the quality of the beverage.

The term "fatty flavor" refers to a descriptive name of a flavor on the Beer Flavor Wheel (represented in FIG. 1). Fatty flavors include diacetyl, mineral oil, vegetable oil, "rancid", "butyric", "isovaleric", "cheesy", and "caprylic" flavors.

The term "undesirable fatty flavor" refers to any fatty flavor that is not desirable from the view point of quality of an alcoholic beverage. When a fatty flavor becomes undesirable, one or more ingredient(s) causing the fatty flavor needs removal, either partly or completely, in order to improve the quality of the beverage.

The term "complex" refers to a molecular architecture wherein two or more chemical entities are held together by non-covalent chemical bonds. N-vinyl lactam is a heterocyclic moiety with an amide carbonyl that is a strong hydrogen bond acceptor. Hydrogen peroxide is a strong hydrogen bond donor. In the polymer-hydrogen peroxide complexes according to the invention, hydrogen peroxide molecules are bonded by hydrogen bonds to lactam moieties on the N-vinyl lactam polymer backbone, thereby resulting in stable macromolecular complexes.

The term "colloidal haze" refers to haze formation by one or more colloidal substances, or haze formation by haze-forming precursors, such as proteins and polyphenols, which complex over time to form colloidal haze.

All percentages, ratio, and proportions used herein are based on a weight basis unless other specified.

In a first aspect, the invention provides a method of treating an alcoholic beverage to remove at least one ingredient causing at least one undesirable sulfury and/or fatty flavor comprising contacting the beverage with a composition comprising a polymer-hydrogen peroxide complex, wherein the polymer is derived from at least one N-vinyl lactam monomer, and wherein the hydrogen peroxide is present in an amount from about 1% by weight to about 50% by weight of the polymer-hydrogen peroxide complex.

The N-vinyl lactam monomer has a structure:

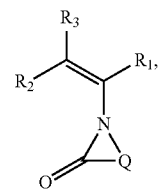

wherein Q is a functionalized or unfunctionalized $C_1$-$C_{10}$ alkylene and each $R_1$, $R_2$, and $R_3$ is independently selected from the group consisting of hydrogen and functionalized and unfunctionalized $C_1$-$C_4$ alkyl groups. Non-limiting examples of Q include functionalized and unfunctionalized —$CH_2$—$CH_2$—, —$CH_2$—$CH_2$—$CH_2$—, —$CH_2$—$CH_2$—$CH_2$—$CH_2$—, and —$CH_2$—$CH_2$—$CH_2$—$CH_2$—$CH_2$— groups. Particularly, Q is —$CH_2$—$CH_2$—$CH_2$— or —$CH_2$—$CH_2$—$CH_2$—$CH_2$—$CH_2$— group. Particularly, each $R_1$, $R_2$, and $R_3$ is independently selected from the group consisting of hydrogen and methyl groups. More particularly, each $R_1$, $R_2$, and $R_3$ is hydrogen.

Non-limiting examples of N-vinyl lactam monomers include N-vinyl-2-pyrrolidone, N-vinyl-2-piperidone, N-vinyl-2-caprolactam, N-vinyl-3-methyl-2-pyrrolidone, N-vinyl-3-methyl-2-piperidone, N-vinyl-3-methyl-2-caprolactam, N-vinyl-4-methyl-2-pyrrolidone, N-vinyl-4-methyl-2-caprolactam, N-vinyl-5-methyl-2-pyrrolidone, N-vinyl-5-methyl-2-piperidone, N-vinyl-5,5-dimethyl-2-pyrrolidone, N-vinyl-3,3,5-trimethyl-2-pyrrolidone, N-vinyl-5-methyl-5-ethyl-2-pyrrolidone, N-vinyl-3,4,5-trimethyl-3-ethyl-2-pyrrolidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, and combinations thereof. Particularly, N-vinyl lactam is selected from the group consisting of N-vinyl-2-pyrrolidone, N-vinyl-2-piperidone, N-vinyl-2-caprolactam, and combinations thereof. More particularly, N-vinyl lactam monomer is selected from the group consisting of N-vinyl-2-pyrrolidone, N-vinyl-2-piperidone, N-vinyl-2-caprolactam, and combinations thereof. Even more particularly, N-vinyl lactam monomer is N-vinyl-2-pyrrolidone.

In a particular embodiment, the polymer component of the polymer-peroxide complex according to the invention is a homopolymer of N-vinyl-2-pyrrolidone, N-vinyl-2-piperidone, or N-vinyl-2-caprolactam. More particularly, the polymer is a homopolymer of N-vinyl-2-pyrrolidone. Even more particularly, the polymer is polyvinylpyrrolidone (PVP) or polyvinyl polypyrrolidone (PVPP).

In a particular embodiment, the N-vinyl lactam homopolymer is crosslinked with at least one crosslinker. Particularly, the crosslinker(s) are selected from the group consisting of N, N'-divinyl imidazolidinone, 3-ethylidene-N-vinyl-2-pyrrolidinone, ethylene glycol di(meth)acrylate, ethylene glycol di(meth)acrylamide, butanediol di(meth)acrylate, polyethylene glycol di(meth)acrylate, polyethylene glycol di(meth)acrylamide, trimethylolpropane tri(meth)acrylate, trimethylolpropane diallyl ether, pentaerythritol triallyl ether, methylenebis(meth)acrylamide, and combinations thereof. More particularly, the crosslinker is selected from the group consisting of N, N'-divinyl imidazolidinone, 3-ethylidene-N-vinyl-2-pyrrolidinone, and combinations thereof.

In a particular embodiment, the polymer component of the polymer-hydrogen peroxide complex is a crosslinked homopolymer of N-vinyl-2-pyrrolidone, N-vinyl-2-piperidone, or N-vinyl-2-caprolactam, wherein the crosslinker is selected from the group consisting of N, N'-divinyl imidazolidinone, 3-ethylidene-N-vinyl-2-pyrrolidinone, and combinations thereof.

In a particular embodiment, the polymer component of the polymer-hydrogen peroxide complex is a non-homopolymer derived from at least one N-vinyl lactam monomer and at least one different comonomer.

In a particular embodiment, the non-homopolymer derived from at least one N-vinyl lactam monomer and at least one different comonomer may be crosslinked with at least one crosslinker. Particularly, the crosslinker is selected from the group consisting of N, N'-divinyl imidazolidinone, 3-ethylidene-N-vinyl-2-pyrrolidinone, ethylene glycol di(meth)acrylate, ethylene glycol di(meth)acrylamide, butanediol di(meth)acrylate, polyethylene glycol di(meth)acrylate, polyethylene glycol di(meth)acrylamide, trimethylolpropane tri(meth)acrylate, trimethylolpropane diallyl ether, pentaerythritol triallyl ether, methylenebis(meth)acrylamide, and combinations thereof. More particularly, the crosslinker is selected from the group consisting of N, N'-divinyl imidazolidinone, 3-ethylidene-N-vinyl-2-pyrrolidinone, and combinations thereof.

In particular embodiments, polymers according to the invention are crosslinked. Particularly, crosslinked polymers are obtained by polymerizing the monomer(s) in the presence of one or more crosslinkers. However, polymers can also be crosslinked subsequent to polymerization by physical effects, such as radiation treatment, and/or by chemical reaction with one or more bi- or polyfunctional compound(s) capable of reacting with one or more functional groups present on the polymer backbone, thereby rendering the polymer crosslinked.

In particular embodiments, non-crosslinked polymers according to the invention may have a weight-average molecular weight ranging from about 10,000 Da to about 10,000,000 Da, more particularly from about 25,000 Da to about 1000,000 Da, and even more particularly from about 50,000 Da to about 500,000 Da.

Non-limiting examples of comonomers include functionalized and unfunctionalized (meth)acrylates, (meth)acrylamides, dialkylaminoalkyl (meth)acrylates, dialkylaminoalkyl (meth)acrylamides, dimethylaminopropyl (meth)acrylate, dimethylaminopropyl (meth)acrylamide, vinyl amides, vinyl esters, vinyl acetate, alkyl vinyl ethers, methyl vinyl ether, isobutyl vinyl ether, vinyl alcohol, styrene, maleic anhydride, maleimides, maleates, fumarates, N-vinyl imidazole, N-vinyl triazoles, vinyl sulfones, vinyl carbonates, vinyl carbamates, N-vinyl ureas, vinyl thiocarbamates, vinyl silanes, vinyl siloxanes, (meth)acrylamidoalkyl sulfonic acids, salts of (meth)acrylamidoalkyl sulfonic acids, 2-(meth)acrylamido-2-methyl-1-propanesulfonic acid, salts of 2-(meth)acrylamido-2-methyl-1-propanesulfonic acid, vinyl sulfonic acid, salts of vinyl sulfonic acids, (meth)acrylic acid, salts of (meth)acrylic acids, $C_2$-$C_{30}$ olefins, isobutylene, N-vinyl lactams, N-vinyl-2-pyrrolidone, N-vinyl-2-piperidone, N-vinyl-2-caprolactam, and combinations thereof.

In a particular embodiment, the polymer-hydrogen peroxide complex is a complex of hydrogen peroxide and at least one crosslinked homopolymer of N-vinyl-2-pyrrolidone, N-vinyl-2-piperidone, or N-vinyl-2-caprolactam, wherein the crosslinker is selected from the group consisting of N, N'-divinyl imidazolidinone, 3-ethylidene-N-vinyl-2-pyrrolidinone, and combinations thereof.

The hydrogen peroxide content of polymer-hydrogen peroxide complexes according to the invention ranges from about 1% to about 50% by weight of the polymer-hydrogen peroxide complex. More particularly, the hydrogen peroxide content ranges from about 5% to about 30% by weight of the polymer-hydrogen peroxide complex. Even more particularly, the hydrogen peroxide content ranges from about 10% to about 25% by weight of the polymer-hydrogen peroxide complex.

Non-limiting examples of polymers derived from at least one N-vinyl lactam monomer that may be used for formation of polymer-hydrogen peroxide complexes according to the invention may be found in the following technical publications by Ashland Specialty Ingredients: *Health and nutrition product guide—Performance enhancing products* (August/2008), *Plasdone™ povidones product overview* (April/2010), *Plasdone™ K-12 and K-17 povidones—Solubilizers for liquid softgel fill compositions* (September/2010), *Plasdone™ K-29/32 povidone—High efficiency binder for wet granulation* (April/2010), *Plasdone™ S-630 copovidone—*

Product Overview (April/2010), Polyplasdone™ Ultra and Ultra-10 crospovidones—Product overview (September/2010), Polyplasdone™ superdisintegrants—Product overview (July/2010), Polyplasdone™ crospovidone—Superdisintegrants for orally disintegrating and chewable tablets (July/2010), Polyplasdone™ crospovidone—Nonionic superdisintegrant for improved dissolution of cationic drugs (July/2009), Polyplasdone™ crospovidone—The solution for poorly soluble drugs (July/2009), Polyplasdone™ crospovidone—Novel pelletization aid for extrusion spheronization (July/2010), PVP-Iodine povidone iodine antiseptic agent (March/2004), and Pharmaceutical technical bulletin—PVP-Iodine for prophylaxis and treatment of bovine mastitis (December/2003). Each publication is herein incorporated in its entirety by reference.

Further non-limiting examples of polymers derived from at least one N-vinyl lactam monomer that may be used for formation of polymer-hydrogen peroxide complexes according to the invention include polyvinylpyrrolidones such as PVP K-30, PVP K-60 and PVP K-90, vinylpyrrolidone/vinyl acetate copolymers such as PVP/VA (E, I or W) 735, PVP/VA (E or W) 635, PVP/VA (E or I) 535, PVP/VA (E or I) 335 and PVP/VA S-630, and poly(vinylpyrrolidone/dimethylaminoethylmethacrylate) polymers such as Copolymer 845/937. Additional details on the aforementioned polymers may be found in a publication from Ashland Specialty Ingredients titled "*A Composition Guide for Excellent Hair Styling Gels and Lotions*" (2002) that is herein incorporated in its entirety by reference.

Further non-limiting examples of polymers derived from at least one N-vinyl lactam monomer that may be used for formation of polymer-hydrogen peroxide complexes according to the invention include Antaron™ (Ganex™) polymers available for sale from Ashland. Ganex™ polymers are copolymers produced from alpha-olefin and vinylpyrrolidone. The Antaron™ (Ganex™) family of alkylated polyvinylpyrrolidones are relatively low molecular weight polymers varying in degree of hydrophobicity from water soluble powder (P-904LC) to water insoluble flaked solid (WP-660).

Further non-limiting examples of polymers derived from at least one N-vinyl lactam monomer that may be used for formation of polymer-hydrogen peroxide complexes according to the invention include Polyclar™ stabilizers available for sale from Ashland. Information about these polymers may be found in one or more of the following technical publications by Ashland: *Polyclar™ Plus 730 PVPP* (Poster 51, Master Brewers Association of America, 1999); *A Novel Stabilization of Beer* (Poster 15, Master Brewers Association of America, 2001); *A Novel Stabilization of Beer* (Poster 15, Master Brewers Association of America, 2002); *A New Direction in Beer Stabilization* (Institute of Brewing & Distilling, Africa Section, Proceedings of the Seventh Brewing Congress, Nairobi, Kenya, 1999); *Superior Colloidal Stabilization of Beer by Combined Treatment with Silica (Xerogel) and Polyclar™ Plus 730 PVPP* (Master Brewers Association of the Americas Technical Quarterly, Volume 37, Issue Number 1, 2000); *PVPP—The Route to Successful Beer Stabilization* (Brewers' Guardian, May 2000); *A Novel Beer Stabilizer* (The New Brewer, July/August 2002); *A Novel Stabilization of Beer with Polyclar™ Brewbrite stabilizer* (Master Brewers Association of the Americas Technical Quarterly, Volume 39, Issue Number 1, 2002); *Beer Stabilization Technology—Clearly a Matter of Choice* (Master Brewers Association of the Americas Technical Quarterly, Volume 42, Issue Number 4, 2005); *Beer Stabilization Technology* (The Brewer & Distiller, Volume 2, Issue 6, June 2006); *Preventing polyphenol oxidation of wine with Polyclar™ Ultra K-100—a novel polyvinylpolypyrrolidone (PVPP) blend* (The Australian Grapegrower & Winemaker, Annual Technical Issue 2000); and *The use of Polyclar (PVPP) for preventative and remedial treatment of wine* (The Australian Grapegrower & Winemaker). Each publication is herein incorporated in its entirety by reference.

Further non-limiting examples of polymers derived from at least one N-vinyl lactam monomer that may be used for formation of polymer-hydrogen peroxide complexes according to the invention include the following polymeric compositions available for sale from BASF: Crosspure®, Divergan®, Luvitec®, and Luviskol®.

Figure 2:
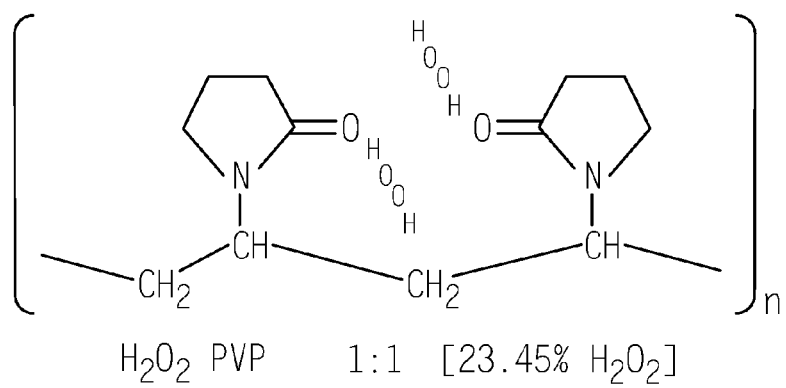
FIG. 2 depicts a representative structure of Peroxydone™ (PVPP. $H_2O_2$) complexes.
Figure 2:
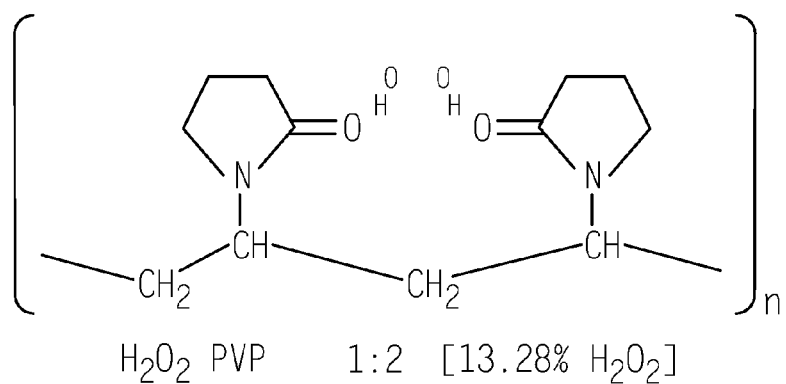

In a particular embodiment, polymer-hydrogen peroxide complexes according to the invention are Peroxydone™ complexes. These complexes are a family of highly stable, solid complexes of hydrogen peroxide with pharmaceutical-grade polyvinylpyrrolidone. Details on the Peroxydone™ complexes may be found in a technical publication from Ashland Specialty Ingredients titled *Peroxydone™ complexes—Novel Solution for Teeth Whiteners*. The publication is herein incorporated in its entirety by reference. Peroxydone™ K-30 and K-90 complexes are free-flowing, white powders based on linear polyvinylpyrrolidone (PVP) of differing molecular weights. Peroxydone™ XL-10 complex is based on crosslinked PVP. Peroxydone™ XL-10 complex is a free-flowing, white powder, and is insoluble in water and most solvents due to the cross-linked nature of the base polymer. Peroxydone™ complexes contain a mixture of 1:1 and 1:2 ratios of hydrogen peroxide to N-vinyl pyrrolidone. More particularly, the polymer-hydrogen peroxide complex is selected from the group consisting of Peroxydone™ XL-10 complex, Peroxydone™ K-30 complex, Peroxydone™ K-90 complex, and combinations thereof. A representative structure of Peroxydone™ complexes is shown in FIG. 2.

The alcoholic beverages according to the invention include fermented beverages and distilled beverages, among others.

Non-limiting examples of fermented beverages include beer, cauim (made from cassava or maize), chicha (made from cassava, maize root, grape, apple or other fruits), cider (made from apple juice or other fruit juice), huangjiu (Chinese, made from rice, millet, or wheat using a special starter culture of yeast, mold, and bacteria), icariine liquor, mead (made from honey), palm wine (made from the sap of various palm trees), pulque (originally made by the natives of Mexico, made from the sap of the maguey plant), tiswin (made from corn or saguaro, a large cactus), and wine.

Non-limiting examples of distilled beverages include vodka, gin, baijiu, tequila, rum, whisky, brandy, and soju.

In a particular embodiment, the alcoholic beverage is a fermented beverage. Particularly, the fermented beverage is beer or wine. Even more particularly, the fermented beverage is beer.

Non-limiting examples of ingredients causing undesirable sulfury flavors include hydrogen sulfide, mercaptans, sulfuric acid, sulfate slats, sulfurous acid, sulfurous acid salts, bisulfites, thioesters, methyl mercaptan, ethyl mercaptan, butyl mercaptan, dimethyl sulfide, dimethyl disulfide, dimethyl trisulfide, dimethyl tetrasulfide, diethyl sulfide, diethyl disulfide, and polysulfides.

In a particular embodiment, the ingredient causing undesirable sulfury flavor is hydrogen sulfide and/or dimethyl sulfide.

In a particular embodiment, the ingredient causing undesirable fatty flavor is diacetyl.

The methods of treatment of alcoholic beverages according to the invention result in removal of one or more ingredients causing one or more undesirable sulfury flavors and/or fatty flavors. The amount of the ingredients causing the undesirable sulfury flavors and/or fatty flavors that may be removed varies depending on several factors. Some of the factors include: time of contact of the polymer-hydrogen peroxide complex with the beverage, amount and/or frequency of polymer-hydrogen peroxide complex used for dosing, temperature of contact of the polymer-hydrogen peroxide complex with the beverage, mode of contacting the polymer-hydrogen peroxide complex with the beverage, mode of removal of the residual polymer-hydrogen peroxide complex from the treated beverage, presence of other constituents in the beverage, source or origin of the beverage, and the like. It is contemplated that contacting the polymer-hydrogen peroxide complex with the alcoholic beverage may be done upstream and/or downstream during the beverage making process.

The removal of one or more ingredients causing one or more undesirable sulfury and/or fatty flavors in alcoholic beverages using the methods of treatment described herein may vary from partial removal to near complete removal. Particularly, the amount of one or more ingredient(s) removed may range from about 0.1% to 100% by weight of these ingredient(s) in the beverage prior to treatment. More particularly, the amount of one or more ingredient(s) removed may range from about 20% to about 99% by weight of these ingredient(s) in the beverage prior to treatment. Even more particularly, the amount of ingredient(s) removed may range from about 50% to about 99% by weight of these ingredient(s) in the beverage prior to treatment.

In a particular embodiment, the composition comprising a polymer-hydrogen peroxide complex according to the invention is a dispersion, slurry, cake, powder, granules, or beads. More particularly, the composition is a powder.

The polymer-hydrogen peroxide complex may be water soluble or water insoluble. Particularly, the polymer-hydrogen peroxide complex is water insoluble.

Any of the method(s) known to a person having ordinary skill in the art may be used in contacting the composition comprising the polymer-hydrogen peroxide complexes with the alcoholic beverage.

In a particular embodiment, contacting an alcoholic beverage with a composition comprising a polymer-hydrogen peroxide complex according to the invention involves adding the composition to the alcoholic beverage. Particularly, the composition is added in an amount from about 0.001% to about 1% by weight of the alcoholic beverage. More particularly, the composition is added in an amount from about 0.005% to about 0.5% by weight of the alcoholic beverage. Even more particularly, the composition is added in an amount from about 0.01% to about 0.1% by weight of the alcoholic beverage.

The time for contacting an alcoholic beverage with a composition comprising a polymer-hydrogen peroxide complex according to the invention may vary depending on many factors, some of which include the quality of the alcoholic beverage taken upstream, physicochemical characteristics of the composition of the polymer-hydrogen peroxide complex chosen for treatment, the amount of reduction of one or more sulfury and/or fatty off flavors desired post-treatment, and the like.

In one embodiment, the alcoholic beverage treatment method according to the invention may include one or more additional steps after the step of contacting. One such non-limiting, yet particular step is a step of separating the residual polymer-hydrogen peroxide complex from the treated beverage. The term "residual" is meant to describe the state of the polymer-hydrogen peroxide complex after beverage treatment. The complex may undergo physical and/or mechanical and/or chemical change in state compared to its initial state prior to contacting with the alcoholic beverage. Non-limiting, yet particular methods of separation of the residual polymer-hydrogen peroxide complex include filtration, centrifugation, decantation, and the like. Any of the method(s) and/or equipment(s) known by a person having ordinary skill in the art may be used for filtration.

In a particular embodiment, the invention provides a method of treating a beer or wine to remove at least one ingredient causing at least one undesirable sulfury and/or fatty flavor comprising contacting the beer or wine with a composition comprising at least one crosslinked N-vinyl lactam homopolymer-hydrogen peroxide complex, wherein the N-vinyl lactam monomer is N-vinyl-2-pyrrolidone, N-vinyl-2-piperidone, or N-vinyl-2-caprolactam, and the crosslinker is selected from the group consisting of N, N'-divinyl imidazolidinone, 3-ethylidene-N-vinyl-2-pyrrolidinone, and combinations thereof. Particularly, the N-vinyl lactam monomer is N-vinyl pyrrolidone.

More particularly, the invention provides a method of treating a beer or wine to remove diacetyl and/or hydrogen sulfide and/or dimethyl sulfide comprising contacting the beer or wine with a composition comprising Peroxydone™ XL-10 complex, Peroxydone™ K-30 complex, and/or Peroxydone™ K-90 complex.

In a second aspect, the invention provides a method of treating an alcoholic beverage to remove at least (a) at least one ingredient causing at least one undesirable sulfury and/or fatty flavor, and (b) at least one ingredient causing colloidal haze, comprising contacting the beverage with a composition comprising a polymer-hydrogen peroxide complex, wherein the polymer is derived from at least one N-vinyl lactam monomer, and wherein the hydrogen peroxide is present from about 1% by weight to about 50% by weight of the complex.

Non-limiting examples of ingredients that are known to cause colloidal haze in alcoholic beverages such as beer and wine include proteins, tannins, phenols, polyphenols, carbohydrates, oxygen, metal ions, and combinations thereof. Particularly, a colloidal haze causing ingredient is at least one polyphenol.

In a third aspect, the invention provides a method of preparing an alcoholic beverage that comprises one or more methods of treatment described herein.

The treatment step may be introduced at one or several stages during the alcoholic beverage manufacturing process. Further, one or more treatment step(s) might be introduced upstream and/or downstream during the beverage manufacturing process. The treatment step(s) may be followed by any number of additional steps that are used in beverage manufacturing, such as separation by filtration, centrifugation, and the like.

In a forth aspect, the invention provides an alcoholic beverage obtained by the method(s) described herein.

Methods of Synthesis

The polymers according to the invention may be readily synthesized by procedures known by those skilled in the art, non-limiting examples of which include free radical solution polymerization, dispersion polymerization, emulsion polymerization, ionic chain polymerization, living polymerization, and precipitation polymerization.

Free radical polymerization may be used, especially when using water-dispersible and/or water-soluble reaction solvent(s). This type of polymerization method is described in "Decomposition Rate of Organic Free Radical Polymerization" by K. W. Dixon (section II in Polymer Handbook, volume 1, 4th edition, Wiley-Interscience, 1999), which is herein incorporated in its entirety by reference.

Compounds capable of initiating the free-radical polymerization include those materials known to function in the prescribed manner, and include the peroxo and azo classes of materials. Peroxo and azo compounds include, but are not limited to: acetyl peroxide; azo bis-(2-amidinopropane) dihydrochloride; azo bis-isobutyronitrile; 2,2'-azo bis-(2-methylbutyronitrile); benzoyl peroxide; di-tert-amyl peroxide; di-tert-butyl diperphthalate; butyl peroctoate; tert-butyl dicumyl peroxide; tert-butyl hydroperoxide; tert-butyl perbenzoate; tert-butyl permaleate; tert-butyl perisobutylrate; tert-butyl peracetate; tert-butyl perpivalate; para-chlorobenzoyl peroxide; cumene hydroperoxide; diacetyl peroxide; dibenzoyl peroxide; dicumyl peroxide; didecanoyl peroxide; dilauroyl peroxide; diisopropyl peroxodicarbamate; dioctanoyl peroxide; lauroyl peroxide; octanoyl peroxide; succinyl peroxide; and bis-(ortho-toluoyl) peroxide. Also suitable to initiate the free-radical polymerization are initiator mixtures or redox initiator systems, including: ascorbic acid/iron (II) sulfate/sodium peroxodisulfate, tert-butyl hydroperoxide/sodium disulfite, and tert-butyl hydroperoxide/sodium hydroxymethanesulfinate.

The polymerization reactions may be carried out in the presence of one or more solvents. The polymers may be synthesized in a solvent or a blend of one or more solvents and maintained therein, or the synthesis solvent(s) separated from the polymer by methods known in the art and replaced by a solvent beneficial for formulary development and/or end-use. The polymerization temperature may vary from about 5° C. to about 200° C. The polymerization reaction may be carried out at ambient pressure, sub-atmospheric pressure, or super-atmospheric pressure. The polymerization reaction may be carried out in a batch, continuous and/or semi-continuous manner.

The molecular weight of polymers may be controlled using methods known in the art, including strategies to control the reaction temperature and time, as well as the use of chain-transfer agents such as thiols (e.g., dodecyl mercaptan), and halocarbons (e.g., chlorinated compounds like carbon tetrachloride).

The polymer-hydrogen peroxide complexes according to the invention may be prepared by various methods known to a person having ordinary skill in the art. Non-limiting, yet particular methods of preparation of such complexes are described in the following patents/published patent applications, each of which is herein incorporated in its entirety by reference: U.S. Pat. Nos. 5,008,093; 5,008,106; 5,077,047; 5,108,742; 5,177,113; 5,312,619; 5,674,436; EP 581,844; and EP 714,919.

Characterization of Polymers

The polymers and compositions comprising the polymers according to the invention may be analyzed by known techniques. Especially preferred are the techniques of $^{13}C$ nuclear magnetic resonance (NMR) spectroscopy, gas chromatography (GC), and gel permeation chromatography (GPC) in order to decipher polymer identity, residual monomer concentrations, polymer molecular weight, and polymer molecular weight distribution.

Nuclear magnetic resonance (NMR) spectroscopy is an especially preferred method to probe the polymerization product in terms of chemical properties such as monomeric composition, sequencing and tacticity. Analytical equipment suitable for these analyses includes the Inova 400-MR NMR System by Varian Inc. (Palo Alto, Calif.). References broadly describing NMR include: Yoder, C. H. and Schaeffer Jr., C. D., *Introduction to Multinuclear NMR*, The Benjamin/Cummings Publishing Company, Inc., 1987; and Silverstein, R. M., et al., *Spectrometric Identification of Organic Compounds*, John Wiley & Sons, 1981, which are incorporated in their entirety by reference.

Residual monomer levels can be measured by GC, which can be used to indicate the extent of reactant conversion by the polymerization process. GC analytical equipment to perform these tests are commercially available, and include the following units: Series 5880, 5890, and 6890 GC-FID and GC-TCD by Agilent Technologies, Inc. (Santa Clara, Calif.). GC principles are described in *Modern Practice of Gas Chromatography*, third edition (John Wiley & Sons, 1995) by Robert L. Grob and Eugene F. Barry, which is herein incorporated in its entirety by reference.

GPC is an analytical method that separates molecules based on their hydrodynamic volume (or size) in solution of the mobile phase, such as hydroalcoholic solutions with surfactants. GPC is a preferred method for measuring polymer molecular weight distributions. This technique can be performed on known analytical equipment sold for this purpose, and include the TDAmax™ Elevated Temperature GPC System and the RImax™ Conventional Calibration System by Viscotek™ Corp. (Houston, Tex.). In addition, GPC employs analytical standards as a reference, of which a plurality of narrow-distribution polyethylene glycol and polyethylene oxide standards representing a wide range in molecular weight is the preferred. These analytical standards are available for purchase from Rohm & Haas Company (Philadelphia, Pa.) and Varian Inc. (Palo Alto, Calif.). GPC is described in the following texts, which are herein incorporated in their entirety by reference: Schroder, E., et al., *Polymer Characterization*, Hanser Publishers, 1989; Billingham, N.C., *Molar Mass Measurements in Polymer Science*, Halsted Press, 1979; and Billmeyer, F., *Textbook of Polymer Science*, Wiley Interscience, 1984.

Methods of Analysis

Removal of Hydrogen Sulfide and Dimethyl Sulfide from Beer

Sample Preparation and Analysis:

An American lager beer was chilled in a freezer for 30 minutes and was placed in an ice bucket before it was opened for the experimental work. Several empty 20 mL headspace vials were also chilled and various polymer samples were weighed into them in varying levels (100-2000 ppm (parts per million) with respect to a beer sample size of 2 g). Beer bottle was then opened up and 2 g of the beer sample was weighed into the headspace vials containing the polymer materials as well as into ones with no polymers (control). The samples were mixed thoroughly on a shaker and analyzed using a GC instrument equipped with a Sulfur Chemiluminescence Detector.

Results:

The beer samples were treated with varying levels of Peroxydone™ XL-10 (100-2000 ppm) and analyzed. Peroxydone™ XL-10 was found to be effective in reducing hydrogen sulfide ($H_2S$) and dimethyl sulfide (DMS). Peroxydone™ XL-10 was further investigated for its effectiveness as a function of concentration. The results obtained are summarized in Table 1.

TABLE 1

$H_2S$ and DMS removal by Peroxydone™ XL-10 as a function of concentration (in ppm) (data were obtained under identical experimental conditions).

| Beer Treated with Peroxydone™ XL-10 (ppm) | % $H_2S$ Removed | % DMS Removed |
|---|---|---|
| 105 | 48 | 23 |
| 105 | 44 | 23 |
| 190 | 69 | 39 |
| 190 | 71 | 45 |
| 312 | 93 | 66 |
| 312 | 85 | 68 |
| 404 | 88 | 81 |
| 404 | 89 | 81 |
| 510 | 91 | 91 |
| 510 | 88 | 91 |
| 714 | 91 | 98 |
| 714 | 90 | 98 |

The beer samples treated with approximately 1000-2000 ppm of Peroxydone™ XL-10 were further investigated for any new impurities formed during the hydrogen sulfide removal process by analyzing using GC-MS. No new detectable impurities were found to be present in these treated samples based on the data resulted under the experimental conditions used.

Removal of Diacetyl from Beer
Sample Preparation and Analysis:

An amount of 1.0 mL of a beer sample was pipetted out in an 8 dram vial in duplicate and followed by the addition of 0.2 mL of hydrochloric acid (0.1 N), 0.2 mL of derivatizing solution (approximately 200 ppm of 4-nitro-o-phenylenediamine (NPDA) in methanol) and 0.6 mL of methanol to make up the total volume of 2.0 mL. The vial was vortexed briefly and subjected to rotation for 30 minutes in an Enviro-Genie mixer for derivatization at 60° C. The solution was then cooled at room temperature and filtered using 0.2 μm (micrometer) PTFE filter. The clear yellow solution was analyzed using HPLC-UV detector. The derivative of diacetyl and NPDA was detected at 257 nm. Stock solution of diacetyl was prepared in water while stock solution of NPDA was prepared in methanol. External calibration curve was generated by running different diacetyl standards in the concentration range of 0.058 ppm to 5.80 ppm.

Results:

The samples of beer were treated with varying levels of Peroxydone™ XL-10 (100-2000 ppm) and analyzed. Peroxydone™ XL-10 was found to be effective in reducing diacetyl content in beer.

All references including patent applications and publication cited herein are incorporated herein by reference in their entirety and for all purpose to the same extent as if each individual publication or patent or patent application was specifically and individually indicated to be incorporated by reference in its entirety for all purposes. Many modifications and variations of the presently disclosed and claimed inventive concept(s) can be made without departing from its spirit and scope, as will be apparent to those skilled in the art.

What is claimed is:

1. The method of treating an alcoholic beverage to remove at least one ingredient causing at least one undesirable sulfury and/or fatty flavor comprising contacting said beverage with a composition comprising a polymer-hydrogen peroxide complex, wherein said polymer is derived from at least one N-vinyl lactam monomer, and wherein said hydrogen peroxide is present from about 1% by weight to about 50% by weight of said complex, and wherein said ingredient causing undesirable sulfury flavor is selected from the group consisting of hydrogen sulfide, mercaptans, sulfuric acid, sulfate slats, sulfurous acid, sulfurous acid salts, bisulfites, thioesters, methyl mercaptan, ethyl mercaptan, butyl mercaptan, dimethyl sulfide, dimethyl disulfide, dimethyl trisulfide, dimethyl tetrasulfide, diethyl sulfide, diethyl disulfide, polysulfides, and combinations thereof.

2. The method according to claim 1 wherein said ingredient causing undesirable sulfury flavor is hydrogen sulfide and/or dimethyl sulfide.

3. The method according to claim 1 wherein said ingredient causing undesirable fatty flavor is diacetyl.

4. The method according to claim 1 wherein said composition is dispersion, slurry, cake, powder, granules, or beads.

5. The method according to claim 1 wherein said polymer-hydrogen peroxide complex is insoluble in water.

6. The method according to claim 1 further comprising separating residual polymer-hydrogen peroxide complex from said beverage.

7. The method according to claim 6 wherein said separating is by filtering.

8. The method according to claim 1 wherein said contacting is by adding said composition in an amount from about 0.001% to about 1% by weight of said beverage.

9. A method of treating a beer or wine to remove diacetyl and/or hydrogen sulfide and/or dimethyl sulfide comprising contacting said beer or wine with a composition comprising PEROXYDONE™ XL-10 complex, PEROXYDONE™ K-30 complex, and/or PEROXYDONE™ K-90 complex.

10. A beer or wine obtained by the method according to claim 9.

* * * * *